US012634812B2

(12) United States Patent
Li

(10) Patent No.: US 12,634,812 B2
(45) Date of Patent: May 19, 2026

(54) METHOD FOR NETWORK ACCESS ASSISTANCE, AND METHOD AND DEVICE FOR NETWORK ACCESS

(71) Applicant: BEIJING XIAOMI MOBILE SOFTWARE CO., LTD., Beijing (CN)

(72) Inventor: Xiaolong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 260 days.

(21) Appl. No.: 18/261,587

(22) PCT Filed: Jan. 14, 2021

(86) PCT No.: PCT/CN2021/071948
§ 371 (c)(1),
(2) Date: Jul. 14, 2023

(87) PCT Pub. No.: WO2022/151290
PCT Pub. Date: Jul. 21, 2022

(65) Prior Publication Data
US 2024/0073801 A1 Feb. 29, 2024

(51) Int. Cl.
*H04W 48/18* (2009.01)
*H04W 52/02* (2009.01)
(52) U.S. Cl.
CPC ....... *H04W 48/18* (2013.01); *H04W 52/0209* (2013.01)
(58) Field of Classification Search
CPC . H04W 48/18; H04W 52/0209; H04W 48/16; H04W 52/0216; H04W 48/12; Y02D 30/70
See application file for complete search history.

(56) References Cited

U.S. PATENT DOCUMENTS

| | | | |
|---|---|---|---|
| 9,504,012 B1 | 11/2016 | Ljung et al. | |
| 2016/0044550 A1* | 2/2016 | Lee | H04W 76/27 370/331 |
| 2016/0345292 A1* | 11/2016 | Ljung | H04W 36/0085 |
| 2016/0353348 A1* | 12/2016 | Lee | H04W 52/0216 |
| 2017/0195908 A1* | 7/2017 | Lee | H04W 28/0263 |

(Continued)

FOREIGN PATENT DOCUMENTS

| | | | |
|---|---|---|---|
| CN | 111866928 A | 10/2020 | |
| EP | 3886498 A1 * | 9/2021 | H04W 52/0216 |

OTHER PUBLICATIONS

International Search Report & Written Opinion issued Jun. 28, 2021 in PCT/CN2021/071948, filed on Jan. 14, 2021, 12 pages (with English Translation).

(Continued)

*Primary Examiner* — Julio R Perez
(74) *Attorney, Agent, or Firm* — Oblon, McClelland, Maier & Neustadt, L.L.P.

(57) ABSTRACT

A method and a device for network access assistance are disclosed. A network device sends assistance information to a terminal. The assistance information is configured to be used by a terminal to access a network when waking up from a disconnected state. The terminal receives the assistance information sent by the network device. The terminal accesses the network according to the assistance information, in response to waking up from the disconnected state.

20 Claims, 7 Drawing Sheets

(56) References Cited

U.S. PATENT DOCUMENTS

| | | | | |
|---|---|---|---|---|
| 2019/0007884 | A1* | 1/2019 | Koskinen | ............ H04W 36/302 |
| 2020/0314836 | A1* | 10/2020 | Xu | ........................... H04L 5/001 |
| 2021/0051757 | A1* | 2/2021 | Tseng | ..................... H04W 8/08 |
| 2024/0073801 | A1* | 2/2024 | Li | ..................... H04W 52/0209 |

OTHER PUBLICATIONS

"Remaining Issues of IDLE and Inactive Mode for NTN", CATT, 3GPP TSG-RAN WG2 Meeting #112-e, R2-2008837, 2020, 3 pages.
"On Cell Re-selection in NR-NTN", MediaTek Inc., 3GPP TSG-RAN WG2 Meeting #112-e, R2-2008897, 2020, 4 pages.
Extended European Search Report Issued Jan. 25, 2024 in European Application 21918498.3, 21 pages.

* cited by examiner

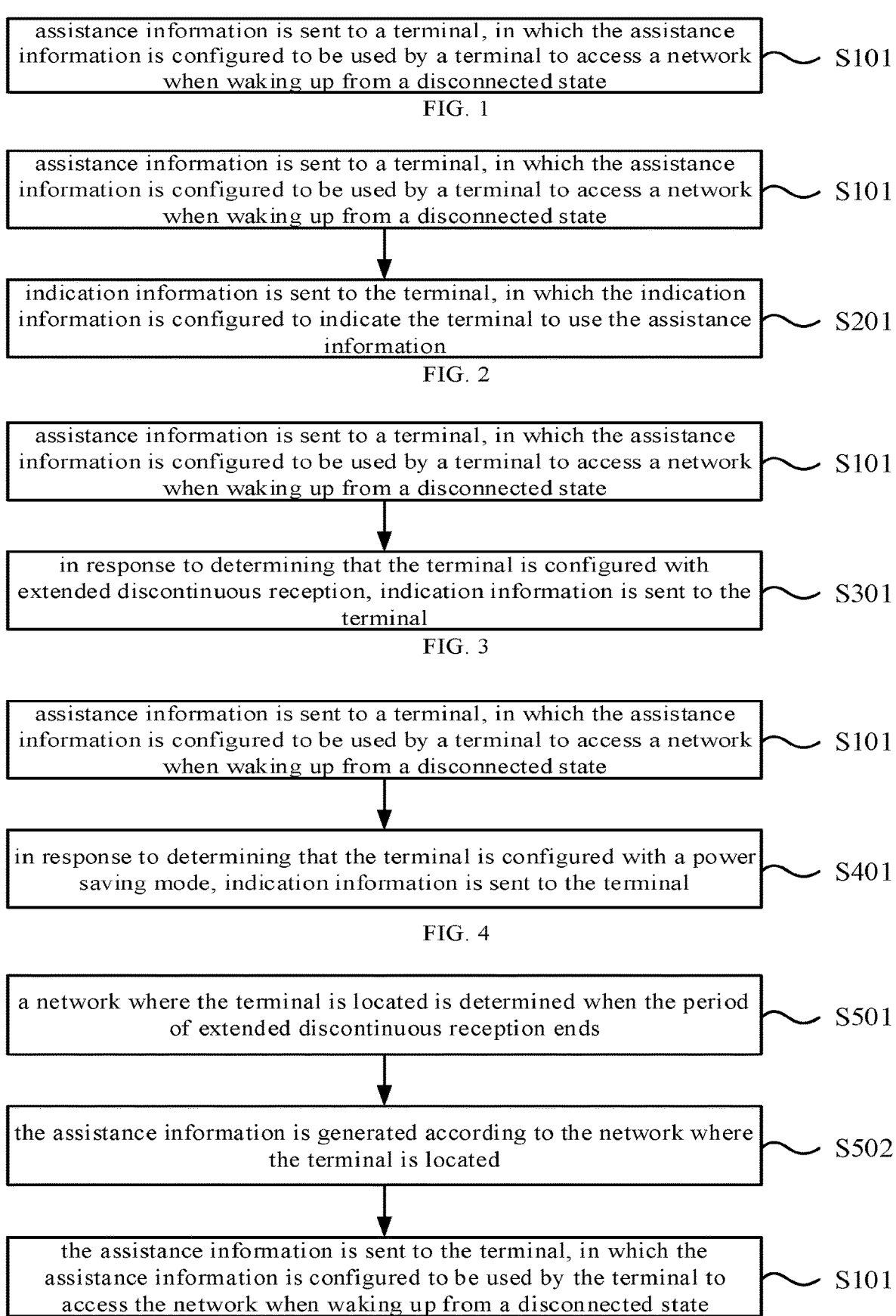

assistance information is sent to a terminal, in which the assistance information is configured to be used by a terminal to access a network when waking up from a disconnected state                    S101

FIG. 1 assistance information is sent to a terminal, in which the assistance information is configured to be used by a terminal to access a network when waking up from a disconnected state                    S101 indication information is sent to the terminal, in which the indication information is configured to indicate the terminal to use the assistance information                    S201

FIG. 2 assistance information is sent to a terminal, in which the assistance information is configured to be used by a terminal to access a network when waking up from a disconnected state                    S101 in response to determining that the terminal is configured with extended discontinuous reception, indication information is sent to the terminal                    S301

FIG. 3 assistance information is sent to a terminal, in which the assistance information is configured to be used by a terminal to access a network when waking up from a disconnected state                    S101 in response to determining that the terminal is configured with a power saving mode, indication information is sent to the terminal                    S401

FIG. 4 a network where the terminal is located is determined when the period of extended discontinuous reception ends                    S501 the assistance information is generated according to the network where the terminal is located                    S502 the assistance information is sent to the terminal, in which the assistance information is configured to be used by the terminal to access the network when waking up from a disconnected state                    S101

FIG. 5

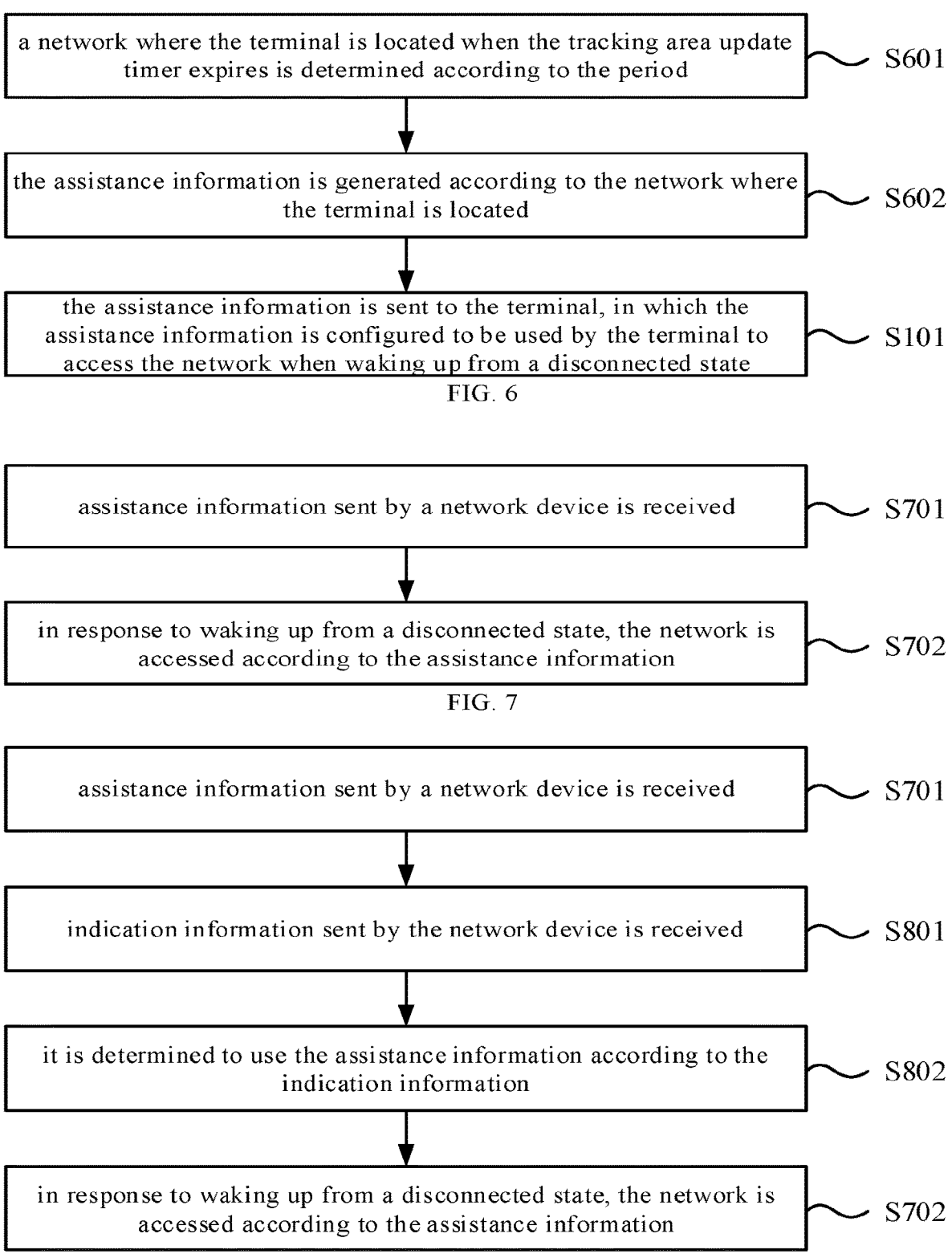

a network where the terminal is located when the tracking area update timer expires is determined according to the period — S601 the assistance information is generated according to the network where the terminal is located — S602 the assistance information is sent to the terminal, in which the assistance information is configured to be used by the terminal to access the network when waking up from a disconnected state — S101

FIG. 6 assistance information sent by a network device is received — S701 in response to waking up from a disconnected state, the network is accessed according to the assistance information — S702

FIG. 7 assistance information sent by a network device is received — S701 indication information sent by the network device is received — S801 it is determined to use the assistance information according to the indication information — S802 in response to waking up from a disconnected state, the network is accessed according to the assistance information — S702

FIG. 8

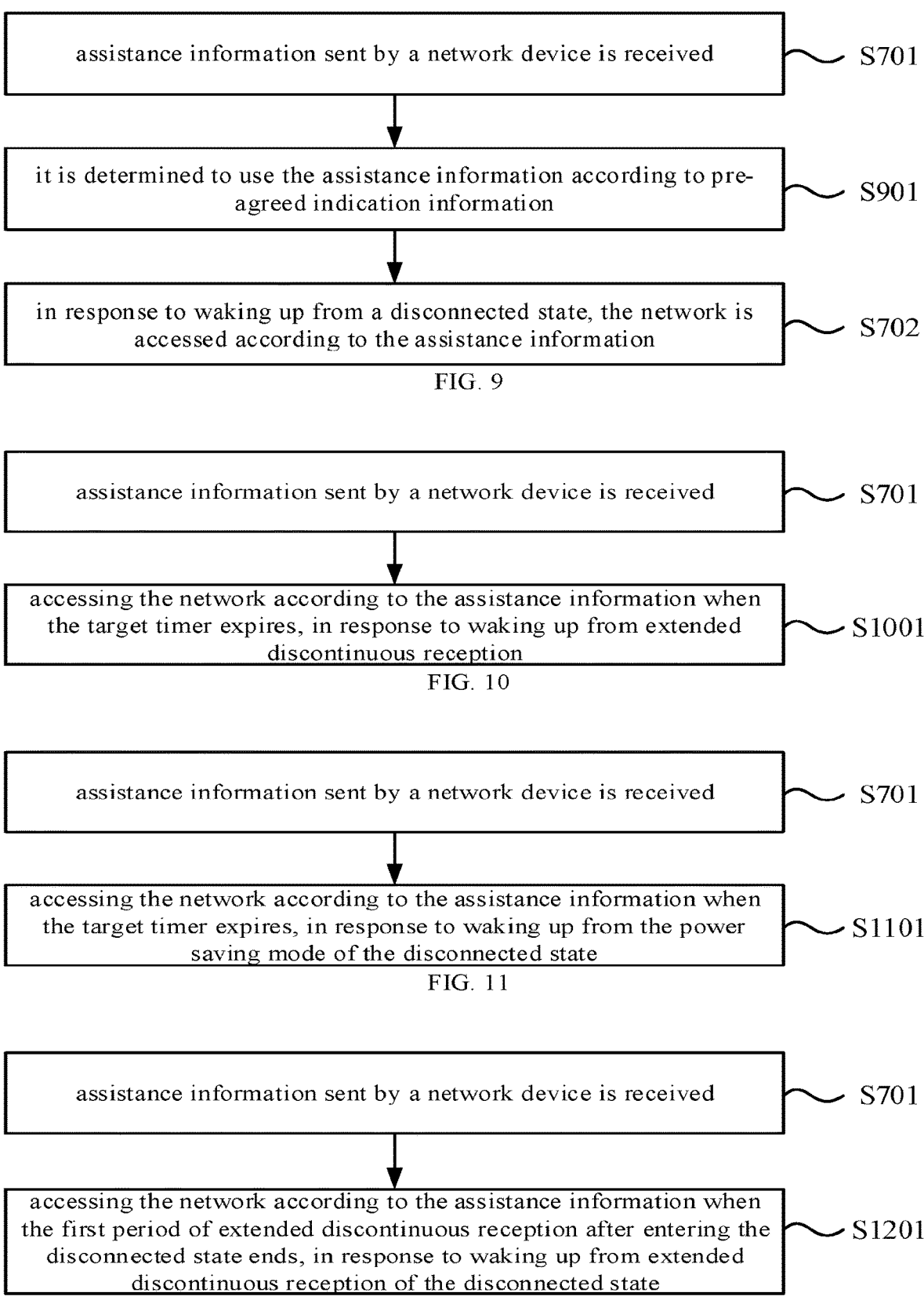

assistance information sent by a network device is received — S701 it is determined to use the assistance information according to pre-agreed indication information — S901 in response to waking up from a disconnected state, the network is accessed according to the assistance information — S702

FIG. 9 assistance information sent by a network device is received — S701 accessing the network according to the assistance information when the target timer expires, in response to waking up from extended discontinuous reception — S1001

FIG. 10 assistance information sent by a network device is received — S701 accessing the network according to the assistance information when the target timer expires, in response to waking up from the power saving mode of the disconnected state — S1101

FIG. 11 assistance information sent by a network device is received — S701 accessing the network according to the assistance information when the first period of extended discontinuous reception after entering the disconnected state ends, in response to waking up from extended discontinuous reception of the disconnected state — S1201

FIG. 12

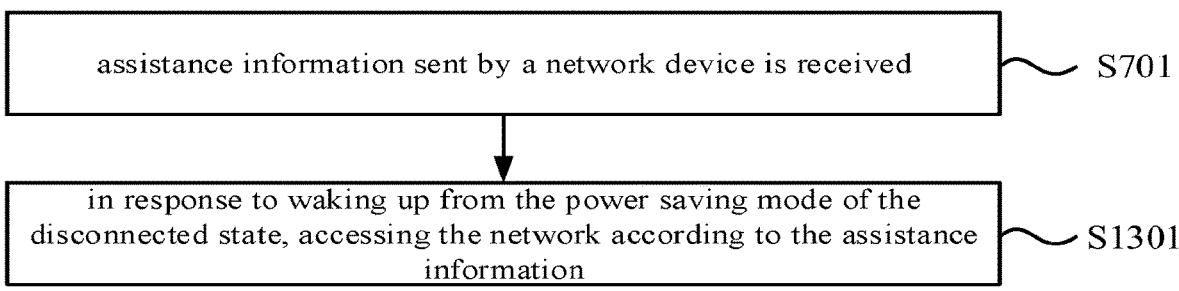

assistance information sent by a network device is received ～ S701 in response to waking up from the power saving mode of the disconnected state, accessing the network according to the assistance information ～ S1301

FIG. 13

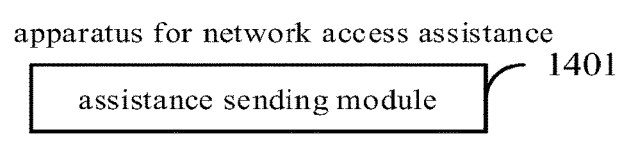

apparatus for network access assistance assistance sending module ⌐ 1401

FIG. 14

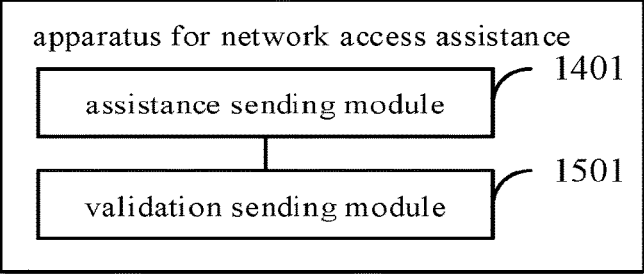

apparatus for network access assistance assistance sending module ⌐ 1401 validation sending module ⌐ 1501

FIG. 15

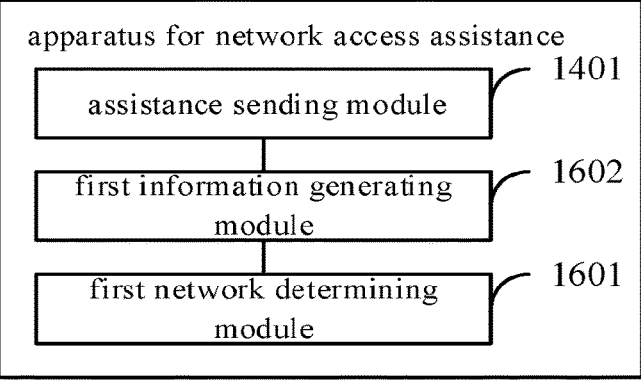

apparatus for network access assistance assistance sending module ⌐ 1401 first information generating module ⌐ 1602 first network determining module ⌐ 1601

FIG. 16 apparatus for network access assistance receiving module — 1801 second use determining module — 2001 network access module — 1802

2100

2122 — processing component wireless transmitting/ receiving component — 2124 antenna component — 2126

METHOD FOR NETWORK ACCESS ASSISTANCE, AND METHOD AND DEVICE FOR NETWORK ACCESS

CROSS-REFERENCE TO RELATED APPLICATION

This application is the US national phase application of International Application No. PCT/CN2021/071948, filed on Jan. 14, 2021, the entire contents of which are incorporated herein by reference for all purposes.

BACKGROUND

Technical Field

The disclosure relates to the field of communication technology, and more particularly, to a method for network access assistance, and a method and device for network access.

Description of the Related Art

In a non-terrestrial network (NTN), a terminal located on the ground can communicate with a base station located on the ground through an aerial device such as a satellite located in the air.

Unlike a terrestrial network where a cell is formed by a base station, in the non-terrestrial network, a cell is formed by a satellite. In the cell formed by the satellite, the terminal can obtain serving cell information and neighboring cell information for subsequent network access.

SUMMARY

According to a first aspect of embodiments of the disclosure, a method for network access assistance is provided. The method is performed by a network device and includes sending assistance information to a terminal, in which the assistance information is configured to be used by a terminal to access a network when waking up from a disconnected state.

According to a second aspect of embodiments of the disclosure, a method for network access is provided. The method is performed by a terminal and includes receiving assistance information sent by a network device, waking up from a disconnected state, an accessing a network according to the assistance information.

According to a third aspect of embodiments of the disclosure, a terminal is provided. The terminal includes a processor and a memory configured to store processor-executable instructions. The processor can be configured to receive assistance information sent by a network device, waking up from a disconnected state, and access a network according to the assistance information.

BRIEF DESCRIPTION OF THE DRAWINGS

In order to illustrate technical solutions in embodiments of the disclosure more clearly, the following briefly introduces the accompanying drawings used in the description of the embodiments. Obviously, the accompanying drawings in the following description are only some embodiments of the disclosure.

FIG. 1 is a flowchart of a method for network access assistance according to embodiments of the disclosure.

FIG. 2 is a flowchart of another method for network access assistance according to embodiments of the disclosure.

FIG. 3 is a flowchart of yet another method for network access assistance according to embodiments of the disclosure.

FIG. 4 is a flowchart of yet another method for network access assistance according to embodiments of the disclosure.

FIG. 5 is a flowchart of yet another method for network access assistance according to embodiments of the disclosure.

FIG. 6 is a flowchart of yet another method for network access assistance according to embodiments of the disclosure.

FIG. 7 is a flowchart of a method for network access according to embodiments of the disclosure.

FIG. 8 is a flowchart of another method for network access according to embodiments of the disclosure.

FIG. 9 is a flowchart of yet another method for network access according to embodiments of the disclosure.

FIG. 10 is a flowchart of yet another method for network access according to embodiments of the disclosure.

FIG. 11 is a flowchart of yet another method for network access according to embodiments of the disclosure.

FIG. 12 is a flowchart of yet another method for network access according to embodiments of the disclosure.

FIG. 13 is a flowchart of yet another method for network access according to embodiments of the disclosure.

FIG. 14 is a block diagram of an apparatus for network access assistance according to embodiments of the disclosure.

FIG. 15 is a block diagram of another apparatus for network access assistance according to embodiments of the disclosure.

FIG. 16 is a block diagram of yet another apparatus for network access assistance according to embodiments of the disclosure.

DETAILED DESCRIPTION OF THE PREFERRED EMBODIMENTS

Figure 17:
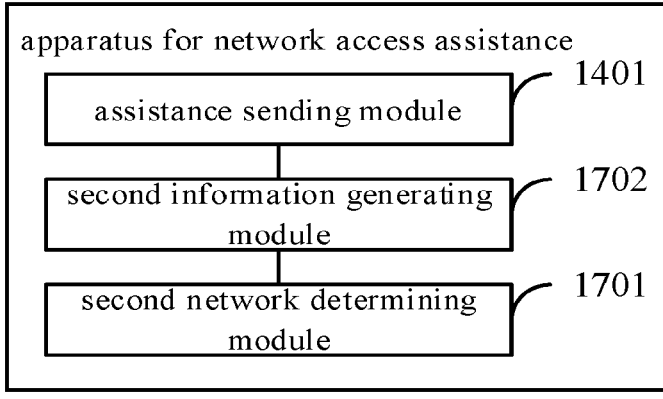
FIG. 17 is a block diagram of yet another apparatus for network access assistance according to embodiments of the disclosure.

The technical solutions in embodiments of the disclosure will be clearly and completely described below with reference to the accompanying drawings in the embodiments of the disclosure. Obviously, the described embodiments are only a part of embodiments of the disclosure, not all of the embodiments. Based on the embodiments in the disclosure, all other embodiments obtained by those of ordinary skill in the art without creative efforts shall fall within the protection scope of the disclosure.

In NTN, a cell is formed by a satellite. In the cell formed by the satellite, a terminal can obtain serving cell information and neighboring cell information for subsequent network access. The terminal may enter a sleep state in order to save power, and does not receive downlink information in the sleep state. Since the satellite is moving at a high speed, so when the terminal wakes up from the sleep state, it may be far away from the previous serving cell formed by the satellite, and the serving cell information and neighboring cell information obtained before entering the sleep state are invalid. Then the terminal does not have enough information to access the network. In order to access the network, it will scan all frequency points of all supported systems to select the appropriate network to access. This requires more power consumption and takes a long time to access the network, which reduces the battery life of the terminal and increases the communication delay.

FIG. 1 is a flowchart of a method for network access assistance according to embodiments of the disclosure. The method for network access assistance shown in the embodiment may be applicable to a network device. The network device includes but is not limited to an aerial device and a base station in a non-terrestrial network. The non-terrestrial network may be, for example, the Internet of Things over non-terrestrial network, IoT-NTN. The IoT-NTN may include NB-IoT-NTN and eMTC-NTN, that is, NB-IoT and eMTC are implemented through a satellite network.

For the aerial device, a terminal on the ground, a base station on the ground and a gateway on the ground can communicate through the aerial device, for example, the base station sends a signal to the aerial device, and then the aerial device sends the signal to the terminal. The base station includes but is not limited to a 4G base station, a 5G base station, a 6G base station, an NB-IoT base station, and an eMTC base station. Or the aerial device is a 4G base station, a 5G base station, a 6G base station, an NB-IoT base station, or an eMTC base station. The terminal includes but is not limited to an electronic device such as a mobile phone, a tablet computer, a wearable device, a sensor, and an Internet of Things device. The aerial device includes, but is not limited to, a satellite, an unmanned aerial vehicle, an aerial platform, etc. The aerial devices can move in the air, and the following mainly takes a satellite as an example for illustrative description.

In one embodiment, the terminal may be a terminal to which the method for network access described in any of the following embodiments is applicable.

As shown in FIG. 1, the method for network access assistance may include the following steps:

In step S101, assistance information is sent to a terminal, in which the assistance information is configured to be used by a terminal to access a network when waking up from a disconnected state.

Waking up may include that the terminal wakes up according to a network configuration, for example, receiving downlink information when a timer configured for the network expires; it may also include that the terminal wakes up according to its own need, for example, the terminal has services required to send uplink data.

In one embodiment, after the terminal enters the disconnected state (e.g., idle state, inactive state), in order to save power, the terminal may enter a sleep state, in which the terminal does not receive downlink information sent by the network. Before entering the disconnected state, serving cell information and neighboring cell information can be received from a satellite corresponding to a serving cell where the terminal is located for subsequent network access.

However, because the satellite moves at a high speed in the air, in a case that the terminal stays in the sleep state for a long time and has not received the downlink information sent by the network for a long time, when the terminal wakes up from the sleep state, it may be far away from the original service cell, the serving cell information and neighboring cell information received before entering the disconnected state are invalid.

According to the embodiments, the assistance information can be sent by the network device to the terminal for use by the terminal to access the network when the terminal wakes up from the disconnected state. Accordingly, after waking up from the disconnected state, the terminal can access the network according to the assistance information, without having to scan all frequency points of all supported systems to select an appropriate network, which is beneficial to reduce the power consumption of accessing the network, and reduce the delay in the process of accessing the network.

In one embodiment, the assistance information is configured to be used by the terminal to perform cell selection or cell reselection in at least one target cell when waking up from a disconnected state.

The terminal may perform cell selection or cell reselection in the at least one target cell according to the assistance information.

The target cell may also be a cell formed by a satellite (for example, a cell formed by the coverage of satellite signals). For example, before the terminal enters the disconnected state, the satellite corresponding to the serving cell where the terminal is located is called satellite A, the satellite A may store ephemeris information of multiple other satellites, such as motion trajectories, motion periods, motion speeds, etc. of other satellites, and satellite A can also predict a duration T from the terminal to wake up after entering the disconnected state.

Therefore, before the terminal enters the disconnected state, the satellite A can predict a cell formed by which satellite where the terminal will be located after the duration T, and the predicted cell is the target cell. Since there may be a certain error in the prediction process, the target cell can be one or more cells.

Furthermore, the satellite can send relevant information for accessing the target cell as assistance information to the terminal, so that the terminal can scan the frequency points of the target cell in a targeted manner, so as to access the target cell, without having to scan all frequency points of all supported systems.

In some embodiments, the assistance information includes at least one of: a public land mobile network (PLMN) to which the target cell belongs; frequency information of the target cell, such as center frequency, uplink frequency, downlink frequency, etc.; identification information of the target cell, such as physical cell identification PCI, etc.; synchronization information of the target cell, such as primary synchronization information PSS, secondary synchronization information SSS, etc., when the non-terrestrial network belongs to the NB-IoT, the PSS may be NB-IoT primary synchronization information NPSS, and the SSS may be NB-IoT secondary synchronization information NSSS.

For example, the assistance information includes the center frequencies of multiple target cells, and the terminal only needs to scan these center frequencies to select a target cell for access, instead of performing on all frequency points of all supported systems. This can greatly reduce the power consumption of accessing the network, reduce the time required for accessing the network, and reduce the delay in the process of accessing the network.

In one embodiment, the assistance information and the target cell are in one-to-one correspondence. For example, for a target cell Cell1 and a target cell Cell2, each assistance information corresponds to the target cells one by one, then for Cell1, the assistance information to be indicated includes frequency information f1 of Cell1, PLMN1 to which Cell1 belongs, PCI1 of Cell1, PSS1 and SSS1 of Cell1; for Cell2, the assistance information to be indicated includes frequency information f2 of Cell2, PLMN2 to which Cell2 belongs, PCI2 of Cell2, PSS2 and SSS2 of Cell2.

In one embodiment, a part of the assistance information is applicable to all target cells, and another part of the information and the target cell are in one-to-one correspondence. For example, for the target cell Cell1 and the target cell Cell2, the frequency information f and PLMN are applicable to both Cell1 and Cell2, and other assistance information corresponds to the target cell one by one, then for Cell1 and Cell2, the f and PLMN in the assistance information can be indicated uniformly, and then the PCI1, PSS1 and SSS1 of the assistance information Cell1 are indicated for Cell1, and the PCI2, PSS2 and SSS2 of the assistance information Cell2 are indicated for Cell2. Accordingly, the indication of f and PLMN can be reduced once, which is beneficial to reduce the communication resources occupied by the assistance information.

In some embodiments, accessing the network by the terminal when waking up from the disconnected state includes at least one of: accessing the network by the terminal when waking up from extended discontinuous reception, or accessing the network by the terminal when waking up from a power saving mode.

In one embodiment, the terminal entering the sleep state may indicate that the terminal enters extended discontinuous reception eDRX or enters a power saving mode PSM.

Since the terminal generally needs to stay in the eDRX or PSM for a long time, in response to waking up from the eDRX or from the PSM, the satellite corresponding to the original serving cell where the terminal is located before entering the eDRX or PSM has flown far away, resulting in the terminal being neither in the original serving cell nor in the cell neighboring to the original serving cell, so that the serving cell information and neighboring cell information received before are invalid.

In the embodiments, the network device can send the assistance information to the terminal for use by the terminal to access the network after waking up from the disconnected state. Accordingly, when the terminal wakes up from the eDRX or from the PSM, it can access the network according to the assistance information, and does not need to scan all frequency points of all supported systems to select an appropriate network due to the previously received serving cell information and neighboring cell information being invalid. This is beneficial to reduce the power consumption of accessing the network, and reduce the delay in the process of accessing the network.

In some embodiments of the disclosure, accessing the network by the terminal when waking up from extended discontinuous reception includes receiving, by the terminal, downlink information sent by the network after a period of extended discontinuous reception ends, and sending, by the terminal, uplink data to the network before the period of extended discontinuous reception ends.

In one embodiment, accessing the network by the terminal when waking up from the eDRX includes but is not limited to two cases.

In one case, the terminal receives downlink information sent by the network after the period of eDRX ends.

There is a paging time window (PTW for short) at the beginning of each period of eDRX. During the paging time window, the terminal can receive downlink information sent by the network. During the period of eDRX other than the paging time window, the terminal is in an unreachable state, that is, it does not receive downlink information sent by the network. In a case that the terminal enters the disconnected state, after a first period of eDRX entered is over, it can enter a second period of eDRX. At the beginning of the second period of eDRX, there may be a PTW, and within the PTW, the terminal can receive downlink information sent by the network. In order to receive the downlink information sent by the network, the terminal may determine the target cell according to the assistance information, and then receive the downlink information sent by the target cell.

In this case, the duration of the terminal from entering the disconnected state to waking up can be regarded as equal to the period of eDRX, or equal to the period of eDRX minus a length of PTW. Then before the terminal enters the disconnected state, the satellite can predict a cell formed by which satellite the terminal will be located after this duration, and then the predicted cell will be used as the target cell.

Another case is that the terminal sends uplink data to the network before the period of eDRX ends.

Although in the period of eDRX, the terminal can receive the downlink information sent by the network only in the PTW at the beginning stage, but in the period of eDRX, the terminal can also send uplink data to the network autonomously. For example, in the period of eDRX, the terminal has services that require uplink data transmission, the terminal can wake up autonomously and send the uplink data to the network. In order to send the uplink data to the network, the terminal may determine the target cell according to the assistance information, and then send the uplink data to the target cell.

In this case, the duration of the terminal from entering the disconnected state to waking up can be regarded as equal to a duration of the terminal from entering the disconnected state to a moment when the terminal sends the uplink data, or equal to a duration of the terminal from entering the PTW in a first period of eDRX to a moment when the terminal sends the uplink data. Then before the terminal enters the disconnected state, the satellite can predict a cell formed by which satellite the terminal will be located after this duration, and then the predicted cell will be used as the target cell.

Usually, the satellite can determine the duration of the terminal from entering the disconnected state to waking up based on a commercial service characteristic of the terminal. For example, when the terminal sends uplink data periodically, the satellite can determine the moment when the terminal sends uplink data according to the period of sending uplink data. In a case that the terminal does not send uplink data periodically, the satellite can estimate a rule of the terminal sending uplink data according to a moment of terminal sending uplink data in history, and then determine the moment when terminal sends uplink data according to the rule.

In one embodiment, the period of eDRX is generally longer, eg, between 20.48 seconds and 2.92 hours.

In some embodiments of the disclosure, accessing the network by the terminal when waking up from the power saving mode includes performing, by the terminal, a tracking area update after a tracking area update (TAU) timer (also called timer T3412) expires, and sending, by the terminal, uplink data to the network before the tracking area update timer expires.

When the terminal enters the disconnected state, before entering the PSM, the terminal may be in a discontinuous reception state for a period of time. The tracking area update timer can be started after a discontinuous reception timer expires, or after the terminal enters the disconnected state, which can be specifically set according to the needs.

In one embodiment, accessing the network by the terminal when waking up from the PSM includes but is not limited to two cases.

One case is that the terminal performs tracking area update after the tracking area update timer expires.

After the tracking area timer expires, the terminal needs to communicate with the network to update the tracking area.

In this case, a duration of the terminal from entering the disconnected state to waking up can be regarded as equal to a duration of the tracking area update timer. Then before the terminal enters the disconnected state, the satellite can predict a cell formed by which satellite the terminal will be located after this duration, and then the predicted cell will be used as the target cell.

Another case is that the terminal sends uplink data to the network before the tracking area update timer expires.

The terminal may update the tracking area after the tracking area update timer expires, and before the tracking area timer expires, the terminal may also send uplink data to the network autonomously. For example, the terminal has services that require uplink data transmission, the terminal may wake up autonomously and send the uplink data to the network. In order to send the uplink data to the network, the terminal may determine the target cell according to the assistance information, and then send the uplink data to the target cell.

In this case, a duration of the terminal from entering the disconnected state to waking up can be regarded as equal to a duration of the terminal from entering the disconnected state to a moment when the terminal sends the uplink data. Then before the terminal enters the disconnected state, the satellite can predict a cell formed by which satellite the terminal will be located after this duration, and then the predicted cell will be used as the target cell.

Usually, the satellite can determine the duration of the terminal from entering the disconnected state to waking up based on a commercial service characteristic of the terminal. For example, when the terminal sends uplink data periodically, the satellite can determine the moment when the terminal sends uplink data according to the period of sending uplink data. In a case that the terminal does not send uplink data periodically, the satellite can estimate a rule of the terminal sending uplink data according to a moment of terminal sending uplink data in history, and then determine the moment when terminal sends uplink data according to the rule.

FIG. 2 is a flowchart of another method for network access assistance according to embodiments of the disclosure. As shown in FIG. 2, in some embodiments of the disclosure, the method further includes:

In step S201, indication information is sent to the terminal, in which the indication information is configured to indicate the terminal to use the assistance information.

In one embodiment, the network may send indication information to the terminal to indicate under which case the terminal can use the assistance information, thereby improving the controllability of the network for the terminal to use the assistance information.

It should be noted that the indication information may be sent by the network to the terminal, or may be pre-agreed in the terminal, for example, as agreed in a protocol.

FIG. 3 is a flowchart of yet another method for network access assistance according to embodiments of the disclosure. As shown in FIG. 3, in some embodiments of the disclosure, the assistance information is configured to be used by the terminal to access the network when waking up from extended discontinuous reception, and sending indication information to the terminal includes:

In step S301, in response to determining that the terminal is configured with extended discontinuous reception, indication information is sent to the terminal.

In one embodiment, the assistance information can be used by the terminal to access the network when it wakes up from eDRX, then the assistance information only works for the terminal when the terminal is configured with eDRX, so in a case that the terminal is configured with eDRX, the network may send the indication information to the terminal. In a case that the terminal is not configured with eDRX, since the assistance information does not work for the terminal, there is no need to send the indication information to the terminal, which is beneficial to save communication resources.

FIG. 4 is a flowchart of yet another method for network access assistance according to embodiments of the disclosure. As shown in FIG. 4, in some embodiments of the disclosure, the assistance information is configured to be used by the terminal to access the network when waking up from the power saving mode, and sending the indication information to the terminal includes:

In step S401, in response to determining that the terminal is configured with a power saving mode, indication information is sent to the terminal.

In one embodiment, the assistance information can be used by the terminal to access the network when it wakes up from the PSM, then the assistance information only works for the terminal when the terminal is configured with PSM, so in a cased that the terminal is configured with PSM, the network may send the indication information to the terminal. In a case that the terminal is not configured with PSM, since the assistance information does not work for the terminal, there is no need to send the indication information to the terminal, which is beneficial to save communication resources.

In some embodiments of the disclosure, the indication information includes a target timer, and the indication information is configured to indicate the terminal to use the assistance information when the target timer expires, or the indication information is configured to indicate the terminal to use the assistance information when the target state is satisfied.

The target timer may be a specific timer, such as a tracking area update timer T3412, or a timer dynamically configured for the network as required. The target state may be a specific state, such as waking up from PSM.

In some embodiments of the disclosure, the indication information is configured to indicate the terminal to use the assistance information when the target timer expires, the assistance information is configured to be used by the terminal to access the network when waking up from extended discontinuous reception, and a timing duration of the target timer is equal to a period of extended discontinuous reception.

In one embodiment, in a case that the indication information instructs the terminal to use the assistance information when the target timer expires, the assistance information may be used by the terminal to access the network when waking up from eDRX, and the timing duration of the target timer is equal to the period of eDRX. In this case, after entering the eDRX, the terminal may determine to use the assistance information to access the network at the end of the period of eDRX.

It should be noted that the duration of the target timer can be set as required, for example, it may be smaller than the period of eDRX, then when the terminal wakes up due to the need of sending the uplink data, and the target timer expires, the terminal uses the assistance information before the period of eDRX ends to access the network.

FIG. 5 is a flowchart of yet another method for network access assistance according to embodiments of the disclosure. As shown in FIG. 5, in some embodiments of the disclosure, the method further includes:

In step S501, a network where the terminal is located is determined when the period of extended discontinuous reception ends;

In step S502, the assistance information is generated according to the network where the terminal is located.

In one embodiment, the duration of the terminal from entering the disconnected state to waking up can be regarded as equal to the period of eDRX. Then, before the terminal enters the disconnected state, the satellite can predict a network where the terminal will be located after this duration, i.e. at the end of the period of eDRX, so as to generate the assistance information according to this network, for example the PLMN of the network, and when the cell where the terminal is located can be specifically predicted, and the predicted cell will be used as the target cell.

In addition, the satellite can predict the duration of the terminal from entering the disconnected state to waking up based on a commercial service characteristic of the terminal. For example, the terminal wakes up and sends uplink data before the period of eDRX ends.

The satellite predicts the network where the terminal will be located when waking up according to the duration, then determines the cell corresponding to the network as the target cell, and then generates the assistance information, such as the PLMN of the cell.

In some embodiments of the disclosure, the indication information is configured to indicate the terminal to use the assistance information when the target timer expires, the assistance information is configured to be used by the terminal to access the network when waking up from the power saving mode, and a timing duration of the target timer is equal to a timing duration of a tracking area update timer.

In one embodiment, in a case that the indication information indicates the terminal to use the assistance information when the target timer expires, the assistance information may be used by the terminal to access the network when waking up from the PSM, and the timing duration of the target timer is equal to the timing duration of the tracking area update timer. In this case, after entering the disconnected state, specifically after entering the PSM, the terminal may determine to use the assistance information when the tracking area update timer expires, and then use the assistance information to access the network.

FIG. 6 is a flowchart of yet another method for network access assistance according to embodiments of the disclosure. As shown in FIG. 6, in some embodiments of the disclosure, the method further includes:

In step S601, a network where the terminal is located when the tracking area update timer expires is determined according to the period;

In step S602, the assistance information is generated according to the network where the terminal is located.

In one embodiment, the duration of the terminal from entering the disconnected state to waking up may be regarded as equal to the duration of the tracking area update timer. Then, before the terminal enters the disconnected state, the satellite can predict a network where the terminal will be located after this duration, i.e. when the tracking area update timer expires, so as to generate the assistance information according to this network, for example the PLMN of the network, and when the cell where the terminal is located can be specifically predicted, the predicted cell will be used as the target cell.

In some embodiments of the disclosure, the indication information is configured to indicate the terminal to use the assistance information when the target state is satisfied, the assistance information is configured to be used by the terminal to access the network when waking up from extended discontinuous reception, and the target state is that a first period of extended discontinuous reception after the terminal enters the disconnected state ends.

In one embodiment, in a case that the indication information instructs the terminal to use the assistance information when the target state is satisfied, the assistance information may be used by the terminal to access the network when waking up from eDRX, and the target state is that a first period of eDRX after the terminal enters the disconnected state ends. In this case, after entering the disconnected state, the terminal may determine to use the assistance information at the end of the first period of eDRX, and then use the assistance information.

In some embodiments of the disclosure, the indication information is configured to indicate the terminal to use the assistance information when the target state is satisfied, the assistance information is configured to be used by the terminal to access the network when waking up from the power saving mode, and the target state is that the terminal wakes up from the power saving mode.

In one embodiment, in a case that the indication information instructs the terminal to use the assistance information when the target state is satisfied, the assistance information may be used by the terminal to access the network when waking up from the PSM, and the target state is that the terminal is wake up from the power saving mode. In this case, after entering the disconnected state, specifically after entering the PSM, the terminal may determine to use the assistance information when the tracking area update timer expires, and then use the assistance information to access the network.

In one embodiment, sending the assistance information to the terminal includes:

The assistance information is sent to the terminal by carrying the assistance information in radio resource control (RRC for short) information.

Before the terminal enters the disconnected state, the satellite can send RRC information to the terminal, in which the assistance information is sent to the terminal by being carried in the RRC information. The RRC information carrying the assistance information includes but is not limited to RRC release-NB information and RRC Early Data Complete-NB information.

FIG. 7 is a flowchart of a method for network access according to embodiments of the disclosure. The method for network access assistance shown in the embodiment may be applicable to a terminal that can communicate with a network device. The network device includes but is not limited to an aerial device and a base station in a non-terrestrial network. The non-terrestrial network may be, for example, the Internet of Things over non-terrestrial network, IoT-NTN. The IoT-NTN may include NB-IoT-NTN and eMTC-NTN, that is, NB-IoT and eMTC are implemented through a satellite network.

For the aerial device, a terminal on the ground, a base station on the ground and a gateway on the ground can communicate through the aerial device, for example, the base station sends a signal to the aerial device, and then the aerial device sends the signal to the terminal. The base station includes but is not limited to a 4G base station, a 5G base station, a 6G base station, an NB-IoT base station, and an eMTC base station. Or the aerial device is a 4G base station, a 5G base station, a 6G base station, an NB-IoT base station, or an eMTC base station. The terminal includes but is not limited to an electronic device such as a mobile phone, a tablet computer, a wearable device, a sensor, and an Internet of Things device. The aerial device includes, but is not limited to, a satellite, an unmanned aerial vehicle, an aerial platform, etc. The aerial devices can move in the air, and the following mainly takes a satellite as an example for illustrative description.

In one embodiment, the network device may be a network device to which the method for network access described in any of the above embodiments is applicable.

As shown in FIG. 7, the method for network access may include the following steps:

In step S701, assistance information sent by a network device is received;

In step S702, in response to waking up from a disconnected state, the network is accessed according to the assistance information.

Waking up may include that the terminal wakes up according to a network configuration, for example, receiving downlink information when a timer configured for the network expires; it may also include that the terminal wakes up according to its own need, for example, the terminal has services required to send uplink data.

In one embodiment, after the terminal enters the disconnected state (e.g., idle state, inactive state), in order to save power, the terminal may enter a sleep state, in which the terminal does not receive downlink information sent by the network. Before entering the disconnected state, serving cell information and neighboring cell information can be received from a satellite corresponding to a serving cell where the terminal is located for subsequent network access.

However, because the satellite moves at a high speed in the air, in a case that the terminal stays in the sleep state for a long time and has not received the downlink information sent by the network for a long time, when the terminal wakes up from the sleep state, it may be far away from the original service cell, the serving cell information and neighboring cell information received before entering the disconnected state are invalid According to the embodiments, the assistance information can be sent by the network device to the terminal for use by the terminal to access the network when the terminal wakes up from the disconnected state. Accordingly, after waking up from the disconnected state, the terminal can access the network according to the assistance information, without having to scan all frequency points of all supported systems to select an appropriate network, which is beneficial to reduce the power consumption of accessing the network, and reduce the delay in the process of accessing the network.

In one embodiment, accessing the network by the terminal according to the assistance information specifically includes: performing cell selection or cell reselection in at least one target cell according to the assistance information.

The terminal may perform cell selection or cell reselection in the at least one target cell according to the assistance information.

The target cell may also be a cell formed by a satellite (for example, a cell formed by the coverage of satellite signals). For example, before the terminal enters the disconnected state, the satellite corresponding to the serving cell where the terminal is located is called satellite A, the satellite A may store ephemeris information of multiple other satellites, such as motion trajectories, motion periods, motion speeds, etc. of other satellites, and satellite A can also predict a duration T from the terminal to wake up after entering the disconnected state.

Therefore, before the terminal enters the disconnected state, the satellite A can predict a cell formed by which satellite where the terminal will be located after the duration T, and the predicted cell is the target cell. Since there may be a certain error in the prediction process, the target cell can be one or more cells.

Furthermore, the satellite can send relevant information for accessing the target cell as assistance information to the terminal, so that the terminal can scan the frequency points of the target cell in a targeted manner, so as to access the target cell, without having to scan all frequency points of all supported systems.

In some embodiments, the assistance information includes at least one of:

a public land mobile network (PLMN) to which the target cell belongs; frequency information of the target cell, such as center frequency, uplink frequency, downlink frequency, etc.; identification information of the target cell, such as physical cell identification PCI, etc.; synchronization information of the target cell, such as primary synchronization information PSS, secondary synchronization information SSS, etc., when the non-terrestrial network belongs to the NB-IoT, the PSS may be NB-IoT primary synchronization information NPSS, and the SSS may be NB-IoT secondary synchronization information NSSS.

For example, the assistance information includes the center frequencies of multiple target cells, and the terminal only needs to scan these center frequencies to select a target cell for access, instead of performing on all frequency points of all supported systems. This can greatly reduce the power consumption of accessing the network, reduce the time required for accessing the network, and reduce the delay in the process of accessing the network.

In one embodiment, the assistance information and the target cell are in one-to-one correspondence. For example, for a target cell Cell1 and a target cell Cell2, each assistance information corresponds to the target cells one by one, then for Cell1, the assistance information to be indicated includes frequency information f1 of Cell1, PLMN1 to which Cell1 belongs, PCI1 of Cell1, PSS1 and SSS1 of Cell1; for Cell2, the assistance information to be indicated includes frequency information f2 of Cell2, PLMN2 to which Cell2 belongs, PCI2 of Cell2, PSS2 and SSS2 of Cell2.

In one embodiment, a part of the assistance information is applicable to all target cells, and another part of the information and the target cell are in one-to-one correspondence. For example, for the target cell Cell1 and the target cell Cell2, the frequency information f and PLMN are applicable to both Cell1 and Cell2, and other assistance information corresponds to the target cell one by one, then for Cell1 and Cell2, the f and PLMN in the assistance information can be indicated uniformly, and then the PCI1, PSS1 and SSS1 of the assistance information Cell1 are indicated for Cell1, and the PCI2, PSS2 and SSS2 of the assistance information Cell2 are indicated for Cell2. Accordingly, the indication of f and PLMN can be reduced once, which is beneficial to reduce the communication resources occupied by the assistance information.

In some embodiments, waking up from the disconnected state includes at least one of waking up from extended discontinuous reception, or waking up from a power saving mode.

In one embodiment, the terminal entering the sleep state may indicate that the terminal enters extended discontinuous reception eDRX or enters a power saving mode PSM.

Since the terminal generally needs to stay in the eDRX or PSM for a long time, in response to waking up from the eDRX or from the PSM, the satellite corresponding to the original serving cell where the terminal is located before entering the eDRX or PSM has flown far away, resulting in the terminal being neither in the original serving cell nor in the cell neighboring to the original serving cell, so that the serving cell information and neighboring cell information received before are invalid.

In the embodiments, the network device can send the assistance information to the terminal for use by the terminal to access the network after waking up from the disconnected state. Accordingly, when the terminal wakes up from the eDRX or from the PSM, it can access the network according to the assistance information, and does not need to scan all frequency points of all supported systems to select an appropriate network due to the previously received serving cell information and neighboring cell information being invalid. This is beneficial to reduce the power consumption of accessing the network, and reduce the delay in the process of accessing the network.

In some embodiments of the disclosure, waking up from extended discontinuous reception includes receiving downlink information sent by the network after a period of extended discontinuous reception ends, and sending uplink data to the network before the period of extended discontinuous reception ends.

In one embodiment, accessing the network by the terminal when waking up from the eDRX includes but is not limited to two cases.

In one case, the terminal receives downlink information sent by the network after the period of eDRX ends.

There is a paging time window (PTW) at the beginning of each period of eDRX.

During the paging time window, the terminal can receive downlink information sent by the network. During the period of eDRX other than the paging time window, the terminal is in an unreachable state, that is, it does not receive downlink information sent by the network. In a case that the terminal enters the disconnected state, after a first period of eDRX entered is over, it can enter a second period of eDRX. At the beginning of the second period of eDRX, there may be a PTW, and within the PTW, the terminal can receive downlink information sent by the network. In order to receive the downlink information sent by the network, the terminal may determine the target cell according to the assistance information, and then receive the downlink information sent by the target cell.

In this case, the duration of the terminal from entering the disconnected state to waking up can be regarded as equal to the period of eDRX, or equal to the period of eDRX minus a length of PTW. Then before the terminal enters the disconnected state, the satellite can predict a cell formed by which satellite the terminal will be located after this duration, and then the predicted cell will be used as the target cell.

Another case is that the terminal sends uplink data to the network before the period of eDRX ends.

Although in the period of eDRX, the terminal can receive the downlink information sent by the network only in the PTW at the beginning stage, but in the period of eDRX, the terminal can also send uplink data to the network autonomously. For example, in the period of eDRX, the terminal has services that require uplink data transmission, the terminal can wake up autonomously and send the uplink data to the network. In order to send the uplink data to the network, the terminal may determine the target cell according to the assistance information, and then send the uplink data to the target cell.

In this case, the duration of the terminal from entering the disconnected state to waking up can be regarded as equal to a duration of the terminal from entering the disconnected state to a moment when the terminal sends the uplink data, or equal to a duration of the terminal from entering the PTW in a first period of eDRX to a moment when the terminal sends the uplink data. Then before the terminal enters the disconnected state, the satellite can predict a cell formed by which satellite the terminal will be located after this duration, and then the predicted cell will be used as the target cell.

Usually, the satellite can determine the duration of the terminal from entering the disconnected state to waking up based on a commercial service characteristic of the terminal. For example, when the terminal sends uplink data periodically, the satellite can determine the moment when the terminal sends uplink data according to the period of sending uplink data. In a case that the terminal does not send uplink data periodically, the satellite can estimate a rule of the terminal sending uplink data according to a moment of terminal sending uplink data in history, and then determine the moment when terminal sends uplink data according to the rule.

In one embodiment, the period of eDRX is generally longer, eg, between 20.48 seconds and 2.92 hours.

In some embodiments of the disclosure, accessing the network by the terminal when waking up from the power saving mode includes performing, by the terminal, a tracking area update after a tracking area update timer expires, and sending, by the terminal, uplink data to the network before the tracking area update timer expires In one embodiment, accessing the network by the terminal when waking up from the PSM includes but is not limited to two cases.

One case is that the terminal performs tracking area update after the tracking area update timer expires.

After the tracking area timer expires, the terminal needs to communicate with the network to update the tracking area.

In this case, a duration of the terminal from entering the disconnected state to waking up can be regarded as equal to a duration of the tracking area update timer. Then before the terminal enters the disconnected state, the satellite can predict a cell formed by which satellite the terminal will be located after this duration, and then the predicted cell will be used as the target cell.

Another case is that the terminal sends uplink data to the network before the tracking area update timer expires.

The terminal may update the tracking area after the tracking area update timer expires, and before the tracking area timer expires, the terminal may also send uplink data to the network autonomously. For example, the terminal has services that require uplink data transmission, the terminal may wake up autonomously and send the uplink data to the network. In order to send the uplink data to the network, the terminal may determine the target cell according to the assistance information, and then send the uplink data to the target cell.

In this case, a duration of the terminal from entering the disconnected state to waking up can be regarded as equal to a duration of the terminal from entering the disconnected state to a moment when the terminal sends the uplink data. Then before the terminal enters the disconnected state, the satellite can predict a cell formed by which satellite the terminal will be located after this duration, and then the predicted cell will be used as the target cell.

Usually, the satellite can determine the duration of the terminal from entering the disconnected state to waking up based on a commercial service characteristic of the terminal. For example, when the terminal sends uplink data periodically, the satellite can determine the moment when the terminal sends uplink data according to the period of sending uplink data. In a case that the terminal does not send uplink data periodically, the satellite can estimate a rule of the terminal sending uplink data according to a moment of terminal sending uplink data in history, and then determine the moment when terminal sends uplink data according to the rule.

FIG. 8 is a flowchart of another method for network access according to embodiments of the disclosure. As shown in FIG. 8, in some embodiments of the disclosure, the method further includes:

In step S801, indication information sent by the network device is received; and In step S802, it is determined to use the assistance information according to the indication information.

In one embodiment, the network may send indication information to the terminal to indicate under which case the terminal can use the assistance information, thereby improving the controllability of the network for the terminal to use the assistance information.

FIG. 9 is a flowchart of yet another method for network access according to embodiments of the disclosure. As shown in FIG. 9, in some embodiments of the disclosure, the method further includes:

In step S901, it is determined to use the assistance information according to pre-agreed indication information.

In one embodiment, the indication information may be pre-agreed in the terminal, for example, agreed by a protocol, and a case under which the assistance information can be used are determined according to the indication information, so as to limit the usage of assistance information and avoid misuse of assistance information.

In some embodiments of the disclosure, the indication information includes a target timer, and the indication information is configured to indicate the terminal to use the assistance information when the target timer expires, or the indication information is configured to indicate the terminal to use the assistance information when the target state is satisfied.

The target timer may be a specific timer, such as a tracking area update timer T3412, or a timer dynamically configured for the network as required. The target state may be a specific state, such as waking up from PSM.

FIG. 10 is a flowchart of yet another method for network access according to embodiments of the disclosure. As shown in FIG. 10, in some embodiments of the disclosure, the indication information is configured to indicate the terminal to use the assistance information when the target timer expires, a timing duration of the target timer is equal to a period of extended discontinuous reception, and accessing the network according to the assistance information, in response to waking up from the disconnected state, includes:

In step S1001, accessing the network according to the assistance information when the target timer expires, in response to waking up from extended discontinuous reception.

In one embodiment, in a case that using the assistance information by the terminal includes the target timer expiring, the assistance information may be used by the terminal to access the network when waking up from eDRX, and the timing duration of the target timer is equal to the period of eDRX. In this case, after entering the eDRX, the terminal may determine to use the assistance information when the target timer expires, i.e., the period of eDRX ends, and then use the assistance information.

It should be noted that the duration of the target timer can be set as required, for example, it may be smaller than the period of eDRX, then when the target timer expires, the terminal uses the assistance information before the period of eDRX ends to access the network.

FIG. 11 is a flowchart of yet another method for network access according to embodiments of the disclosure. As shown in FIG. 11, in some embodiments of the disclosure, the indication information is configured to indicate the terminal to use the assistance information when the target timer expires, a timing duration of the target timer is equal to a timing duration of a tracking area update timer, and accessing the network according to the assistance information, in response to waking up from the disconnected state, includes:

In step S1101, accessing the network according to the assistance information when the target timer expires, in response to waking up from the power saving mode of the disconnected state.

In one embodiment, in a case that using the assistance information by the terminal includes the target timer expiring, the assistance information may be used by the terminal to access the network when waking up from the PSM, and the timing duration of the target timer is equal to the timing duration of the tracking area update timer. In this case, after entering the disconnected state, specifically after entering the PSM, the terminal may determine it is satisfied to use the assistance information when the tracking area update timer expires, and then use the assistance information.

FIG. 12 is a flowchart of yet another method for network access according to embodiments of the disclosure. As shown in FIG. 12, in some embodiments of the disclosure, the indication information is configured to indicate the terminal to use the assistance information when the target state is satisfied, the target state is that a first period of extended discontinuous reception after the terminal enters the disconnected state ends, and accessing the network according to the assistance information, in response to waking up from the disconnected state, includes:

In step S1201, accessing the network according to the assistance information when the first period of extended discontinuous reception after entering the disconnected state ends, in response to waking up from extended discontinuous reception of the disconnected state.

In one embodiment, in a case that using the assistance information by the terminal includes the target state being satisfied, the assistance information can be used by the terminal to access the network when waking up from the eDRX, and the target state is that a first period of eDRX after the terminal enters the disconnected state ends. In this case, after entering the disconnected state, the terminal may determine it is satisfied to use the assistance information at the end of the first period of eDRX, and then use the assistance information.

FIG. 13 is a flowchart of yet another method for network access according to embodiments of the disclosure. As shown in FIG. 13, in some embodiments of the disclosure, the indication information is configured to indicate the terminal to use the assistance information when a target state is satisfied, in which the target state is that the terminal wakes up from a power saving mode, and accessing the network according to the assistance information, in response to waking up from the disconnected state, includes:

In step S1301, in response to waking up from the power saving mode of the disconnected state, accessing the network according to the assistance information.

In one embodiment, in a case that using the assistance information by the terminal includes the target state being satisfied, the assistance information may be used by the terminal to access the network when waking up from the PSM, and the target state is that the terminal is wake up from the power saving mode. In this case, after entering the disconnected state, specifically after entering the PSM, the terminal may determine it is satisfied to use the assistance information when the tracking area update timer expires, and then use the assistance information.

It should be noted that the indication information may be received from the network device, or may be pre-agreed. In a case that the indication information is predetermined, the terminal does not need to receive the indication information sent by the network device, and can automatically determine whether the target state is satisfied. For example, the target state indicated by the pre-agreed indication information is that the terminal wakes up from the power saving mode, then the terminal can autonomously determine to use the assistance information to access the network when it wakes up from the power saving mode, and does not need to determine under what case the assistance information can be used to access the network according to the instruction of the network device. Or the target state indicated by the pre-agreed indication information is that the terminal wakes up from the end of the first period of eDRX, then the terminal can autonomously determine to use the assistance information to access the network when it wakes up from the end of the first period of eDRX, without the need for determine under what case can the assistance information be used to access the network according to the instructions of the network device.

In one embodiment, receiving the assistance information sent by the network device includes radio resource control information sent by the network device is received, in which the radio resource control information carries the assistance information. The RRC information carrying the assistance information includes but is not limited to RRC release-NB information and RRC Early Data Complete-NB information.

Corresponding to the foregoing embodiments of the method for network access assistance and the method for network access, the disclosure also provides embodiments of an apparatus for network access assistance and an apparatus for network access.

FIG. 14 is a block diagram of an apparatus for network access assistance according to embodiments of the disclosure. The apparatus for network access assistance shown in the embodiments may be applicable to network device. The network device includes but is not limited to an aerial device and a base station in a non-terrestrial network. The non-terrestrial network may be, for example, the Internet of Things over non-terrestrial network, IoT-NTN.

The IoT-NTN may include NB-IoT-NTN and eMTC-NTN, that is, NB-IoT and eMTC are implemented through a satellite network.

For the aerial device, a terminal on the ground, a base station on the ground and a gateway on the ground can communicate through the aerial device, for example, the base station sends a signal to the aerial device, and then the aerial device sends the signal to the terminal. The base station includes but is not limited to a 4G base station, a 5G base station, a 6G base station, an NB-IoT base station, and an eMTC base station. Or the aerial device is a 4G base station, a 5G base station, a 6G base station, an NB-IoT base station, or an eMTC base station. The terminal includes but is not limited to an electronic device such as a mobile phone, a tablet computer, a wearable device, a sensor, and an Internet of Things device. The aerial device includes, but is not limited to, a satellite, an unmanned aerial vehicle, an aerial platform, etc. The aerial devices can move in the air, and the following mainly takes a satellite as an example for illustrative description.

In one embodiment, the terminal may be a terminal to which the apparatus for network access described in any of the following embodiments is applicable.

As shown in FIG. 14, the apparatus for network access assistance may include:

an assistance sending module 1401, configured to send assistance information to a terminal, in which the assistance information is configured to be used by a terminal to access a network when waking up from a disconnected state.

In one embodiment, the assistance information is configured to be used by the terminal to perform cell selection or cell reselection in at least one target cell when waking up from the disconnected state.

In one embodiment, the assistance information includes at least one of:

a public land mobile network to which the target cell belongs, frequency information of the target cell, identification information of the target cell, or synchronization information of the target cell.

In one embodiment, the assistance information and the at least one target cell are in one-to-one correspondence; or a part of the assistance information is applicable to all of the at least one target cell, and another part of the assistance information and the at least one target cell are in one-to-one correspondence.

In an embodiment, accessing the network by the terminal when waking up from the disconnected state includes at least one of accessing the network by the terminal when waking up from extended discontinuous reception, or accessing the network by the terminal when waking up from a power saving mode.

In one embodiment, accessing the network by the terminal when waking up from extended discontinuous reception includes receiving, by the terminal, downlink information sent by the network after a period of extended discontinuous reception ends, and sending, by the terminal, uplink data to the network before the period of extended discontinuous reception ends.

In one embodiment, accessing the network by the terminal when waking up from the power saving mode includes performing, by the terminal, a tracking area update after a tracking area update timer expires, and sending, by the terminal, uplink data to the network before the tracking area update timer expires.

FIG. 15 is a block diagram of another apparatus for network access assistance according to embodiments of the disclosure. As shown in FIG. 15, in some embodiments, the apparatus further includes a validation sending module 1501, configured to send indication information to the terminal, in which the indication information is configured to indicate the terminal to use the assistance information.

In one embodiment, the assistance information is configured to be used by the terminal to access the network when waking up from extended discontinuous reception, and the validation sending module is configured to send the indication information to the terminal in response to determining that the terminal is configured with extended discontinuous reception.

In one embodiment, the assistance information is configured to be used by the terminal to access the network when waking up from the power saving mode, the validation sending module is configured to send the indication information to the terminal in response to determining that the terminal is configured with the power saving mode.

In one embodiment, the indication information includes a target timer, and the indication information is configured to indicate the terminal to use the assistance information when the target timer expires, or the indication information is configured to indicate the terminal to use the assistance information when a target state is satisfied.

In one embodiment, the indication information is configured to indicate the terminal to use the assistance information when the target timer expires, the assistance information is configured to be used by the terminal to access the network when waking up from extended discontinuous reception, and a timing duration of the target timer is equal to a period of extended discontinuous reception.

FIG. 16 is a block diagram of another apparatus for network access assistance according to embodiments of the disclosure. As shown in FIG. 16, in some embodiments, the apparatus further includes a first network determining module 1601, configured to determine a network where the terminal is located when the period of extended discontinuous reception ends, and a first information generating module 1602, configured to generate the assistance information according to the network where the terminal is located.

In one embodiment, the indication information is configured to indicate the terminal to use the assistance information when the target timer expires, the assistance information is configured to be used by the terminal to access the network when waking up from the power saving mode, and a timing duration of the target timer is equal to a timing duration of a tracking area update timer.

FIG. 17 is a block diagram of another apparatus for network access assistance according to embodiments of the disclosure. As shown in FIG. 17, in some embodiments, the apparatus further includes a second network determining module 1701, configured to determine a network where the terminal is located when the tracking area update timer expires according to the period, and a second information generating module 1702, configured to generate the assistance information according to the network where the terminal is located.

In one embodiment, the indication information is configured to indicate the terminal to use the assistance information when the target state is satisfied, the assistance information is configured to be used by the terminal to access the network when waking up from extended discontinuous reception, and the target state is that a first period of extended discontinuous reception after the terminal enters the disconnected state ends.

In one embodiment, the indication information is configured to indicate the terminal to use the assistance information when the target state is satisfied, the assistance information is configured to be used by the terminal to access the network when waking up from the power saving mode, and the target state is that the terminal wakes up from the power saving mode.

In an embodiment, the assistance sending module is configured to send the assistance information to the terminal by carrying the assistance information in radio resource control information.

Figure 18:
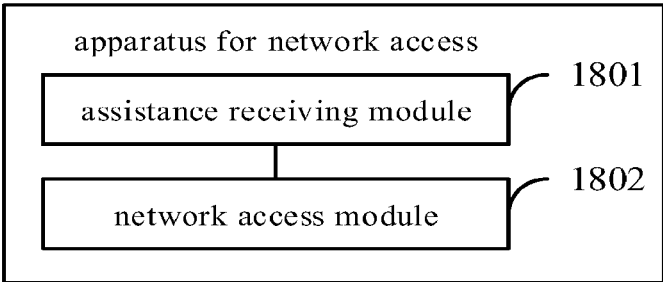
FIG. 18 is a block diagram of an apparatus for network access according to embodiments of the disclosure.

FIG. 18 is a block diagram of an apparatus for network access according to embodiments of the disclosure. The apparatus for network access assistance shown in the embodiment may be applicable to a terminal that can communicate with a network device. The network device includes but is not limited to an aerial device and a base station in a non-terrestrial network. The non-terrestrial network may be, for example, the Internet of Things over non-terrestrial network, IoT-NTN. The IoT-NTN may include NB-IoT-NTN and eMTC-NTN, that is, NB-IoT and eMTC are implemented through a satellite network.

For the aerial device, a terminal on the ground, a base station on the ground and a gateway on the ground can communicate through the aerial device, for example, the base station sends a signal to the aerial device, and then the aerial device sends the signal to the terminal. The base station includes but is not limited to a 4G base station, a 5G base station, a 6G base station, an NB-IoT base station, and an eMTC base station. Or the aerial device is a 4G base station, a 5G base station, a 6G base station, an NB-IoT base station, or an eMTC base station. The terminal includes but is not limited to an electronic device such as a mobile phone, a tablet computer, a wearable device, a sensor, and an Internet of Things device. The aerial device includes, but is not limited to, a satellite, an unmanned aerial vehicle, an aerial platform, etc. The aerial devices can move in the air, and the following mainly takes a satellite as an example for illustrative description.

In one embodiment, the network device may be a network device to which the apparatus for network access described in any of the foregoing embodiments is applicable.

As shown in FIG. 18, the apparatus for network access may include an assistance receiving module 1801, configured to receive assistance information sent by the network device, and a network access module 1802, configured to access a network according to the assistance information in response to waking up from a disconnected state.

In one embodiment, the network access module is configured to perform cell selection or cell reselection in at least one target cell according to the assistance information.

In one embodiment, the assistance information includes at least one of a public land mobile network to which the target cell belongs, frequency information of the target cell, identification information of the target cell, and synchronization information of the target cell.

In one embodiment, the assistance information and the at least one target cell are in one-to-one correspondence; or a part of the assistance information is applicable to all of the at least one target cell, and another part of the assistance information and the at least one target cell are in one-to-one correspondence.

In one embodiment, waking up from the disconnected state includes at least one of waking up from extended discontinuous reception, or waking up from a power saving mode.

In one embodiment, waking up from extended discontinuous reception includes receiving downlink information sent by the network after a period of extended discontinuous reception ends, and sending uplink data to the network before the period of extended discontinuous reception ends.

In one embodiment, waking up from extended discontinuous reception includes performing a tracking area update after a tracking area update timer expires, and sending uplink data to the network before the tracking area update timer expires.

Figure 19:
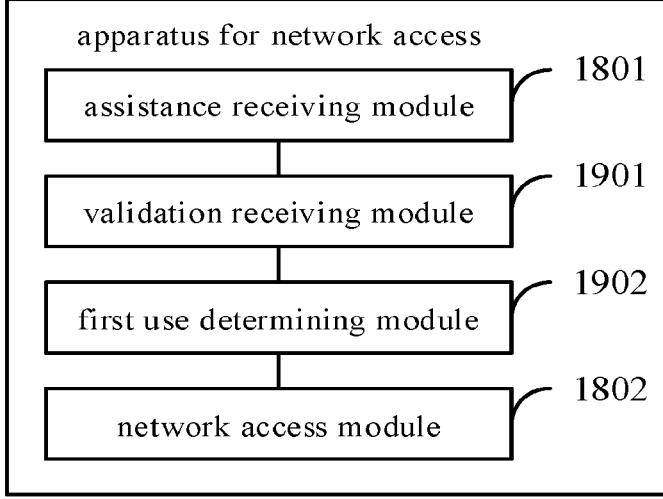
FIG. 19 is a block diagram of another apparatus for network access according to embodiments of the disclosure.

FIG. 19 is a block diagram of another apparatus for network access according to embodiments of the disclosure. As shown in FIG. 19, in some embodiments, the apparatus further includes a validation receiving module 1901, configured to receive indication information sent by the network device, and a first use determining module 1902, configured to determine to use the assistance information according to the indication information.

Figure 20:
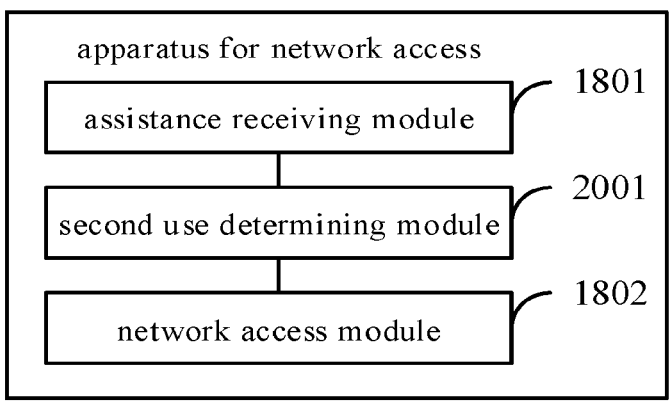
FIG. 20 is a block diagram of yet another apparatus for network access according to embodiments of the disclosure.

FIG. 20 is a block diagram of another apparatus for network access according to embodiments of the disclosure. As shown in FIG. 20, in some embodiments, the apparatus further includes a second use determining module 2001, configured to determine to use the assistance information according to pre-agreed indication information.

In one embodiment, the indication information includes a target timer, and the indication information is configured to indicate the terminal to use the assistance information when the target timer expires, or the indication information is configured to indicate the terminal to use the assistance information when a target state is satisfied.

It should be noted that, when the indication information is pre-agreed, the indication information may not include the target timer, and is only configured to indicate the terminal to use the assistance information when the target timer expires.

In one embodiment, the indication information is configured to indicate the terminal to use the assistance information when the target timer expires, a timing duration of the target timer is equal to a period of extended discontinuous reception, and the network access module is configured to, access the network according to the assistance information when the target timer expires, in response to waking up from extended discontinuous reception.

In one embodiment, the indication information is configured to indicate the terminal to use the assistance information when the target timer expires, a timing duration of the target timer is equal to a timing duration of a tracking area update timer, and the network access module is configured to access the network according to the assistance information when the target timer expires, in response to waking up from the power saving mode of the disconnected state.

In one embodiment, the indication information is configured to indicate the terminal to use the assistance information when the target state is satisfied, the target state is that a first period of extended discontinuous reception after the terminal enters the disconnected state ends, the network access module is configured to access the network according to the assistance information when the first period of extended discontinuous reception after entering the disconnected state ends, in response to waking up from extended discontinuous reception of the disconnected state.

In one embodiment, the indication information is configured to indicate the terminal to use the assistance information when the target state is satisfied, the target state is that the terminal wakes up from the power saving mode, and the network access module is configured to access the network according to the assistance information, in response to waking up from the power saving mode of the disconnected state.

In one embodiment, the assistance receiving module is configured to receive radio resource control information sent by the network device, in which the radio resource control information carries the assistance information.

Regarding the apparatuses in the foregoing embodiments, the specific manners in which each module performs operations have been described in detail in the embodiments of the related methods, and will not be described in detail here.

For the apparatus embodiments, since they basically correspond to the method embodiments, reference may be made to the partial descriptions of the method embodiments for related parts. The device embodiments described above are only illustrative, in which the modules described as separate components may or may not be physically separated, and the components displayed as modules may or may not be physical modules, that is, they may be located in one place, or distributed over multiple network modules. Some or all of the modules may be selected according to actual needs to achieve the purpose of the solution in the embodiments. Those of ordinary skill in the art can understand and implement it without creative effort.

Embodiments of the disclosure also provide an electronic device, including a processor and a memory configured to store processor-executable instructions. The processor is configured to perform the method for network access assistance described in any of the foregoing embodiments.

Embodiments of the disclosure also provide an electronic device, including a processor and a memory configured to store processor-executable instructions. The processor is configured as the method for network access described in any one of the foregoing embodiments.

Embodiments of the disclosure further provide a non-transitory computer-readable storage medium, on which computer programs are stored. When the programs are executed by a processor, the steps of the method for network access assistance described in any of the foregoing embodiments are implemented.

Embodiments of the disclosure further provide a computer-readable storage medium, on which computer programs are stored. When the program are executed by a processor, the steps of the method for network access described in any of the foregoing embodiments are implemented.

Figure 21:
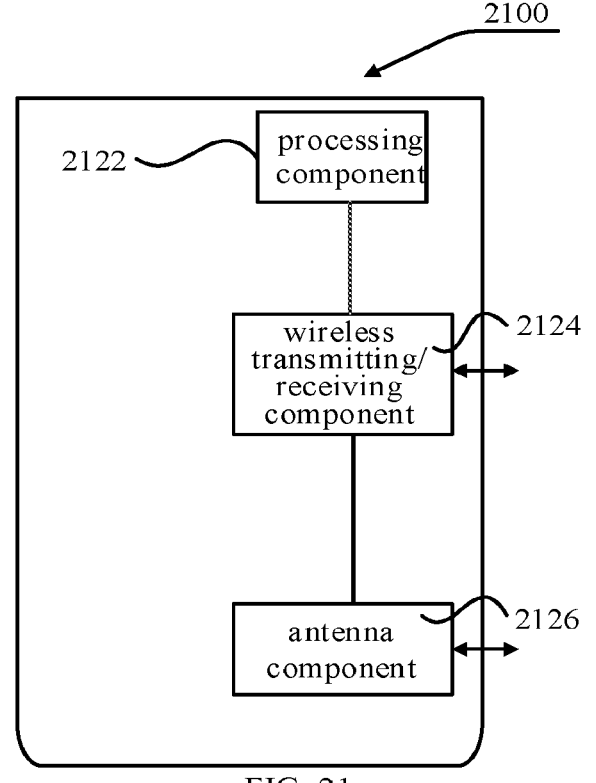
FIG. 21 is a block diagram of a device for network access assistance according to embodiments of the disclosure.

As shown in FIG. 21, FIG. 21 is a block diagram of a device 2100 for network access assistance according to embodiments of the disclosure. The device 2100 may be provided as a network device. Referring to FIG. 21, the device 2100 includes a processing component 2122, a wireless transmitting/receiving component 2124, an antenna component 2126, and a signal processing portion specific to a wireless interface. The processing component 2122 may further include one or more processors. One of the processors in the processing component 2122 may be configured to implement the method for network access assistance described in any of the foregoing embodiments.

Figure 22:
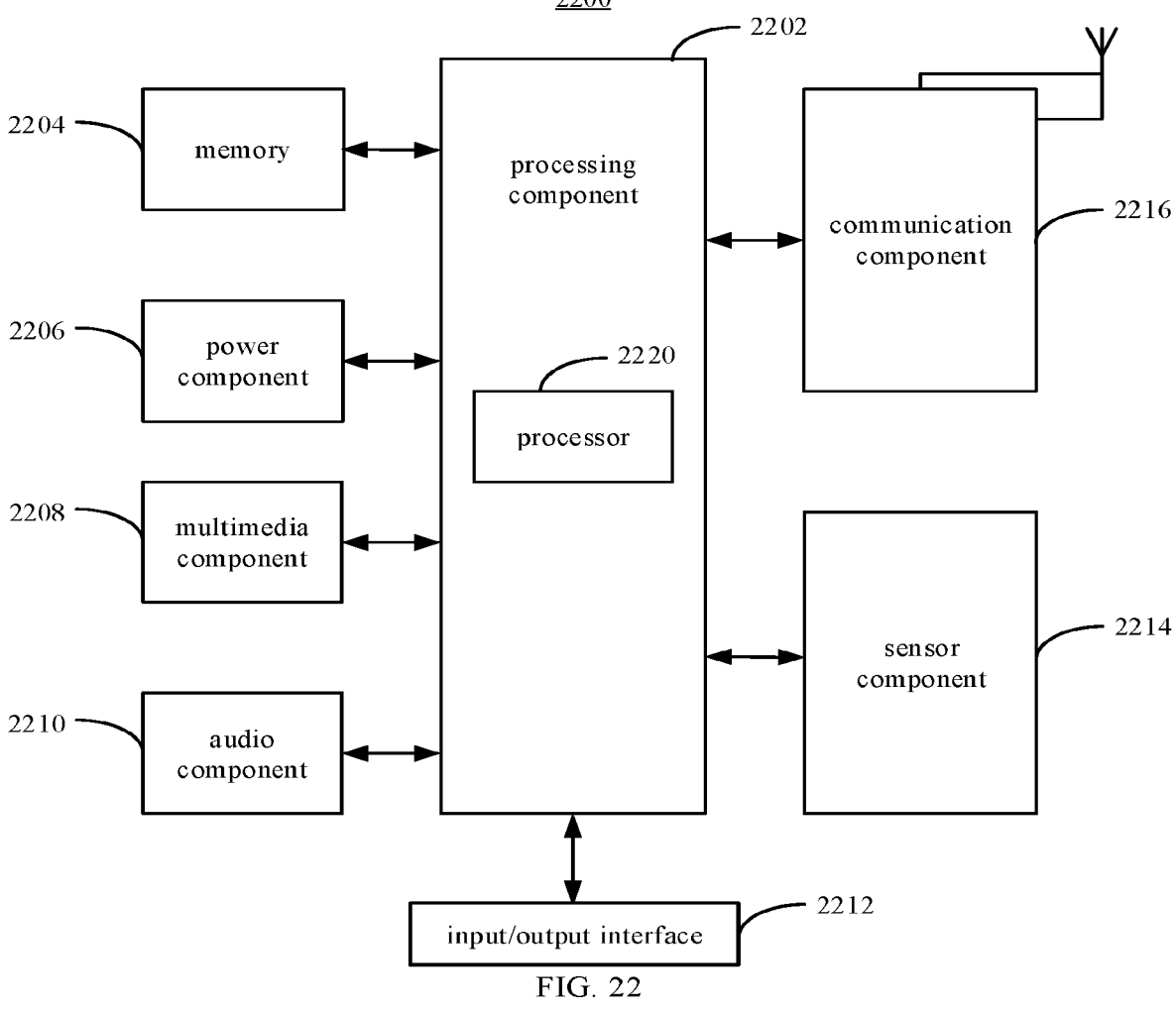
FIG. 22 is a block diagram of a device for network access according to embodiments of the disclosure.

FIG. 22 is a block diagram of a device 2200 for network access according to embodiments of the disclosure. For example, the device 2200 may be a mobile phone, computer, digital broadcast terminal, messaging device, game console, tablet device, medical device, fitness device, personal digital assistant, and the like.

Referring to FIG. 22, the device 2200 may include one or more of the following components: a processing component 2202, a memory 2204, a power component 2206, a multimedia component 2208, an audio component 2210, an input/output (I/O) interface 2212, a sensor component 2214, and a communication component 2216.

The processing component 2202 typically controls overall operations of the device 2200, such as the operations associated with display, telephone calls, data communications, camera operations, and recording operations. The processing component 2202 may include one or more processors 2220 to perform all or part of the steps in the above described method for network access. Moreover, the processing component 2202 may include one or more modules which facilitate the interaction between the processing component 2202 and other components. For example, the processing component 2202 may include a multimedia module to facilitate the interaction between the multimedia component 2208 and the processing component 2202.

The memory 2204 is configured to store various types of data to support the operation of the device 2200. Examples of such data include instructions for any applications or methods operated on the device 2200, contact data, phonebook data, messages, pictures, video, etc. The memory 2204 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 2206 provides power to various components of the device 2200. The power component 2206 may include a power management system, one or more power sources, and any other components associated with the generation, management, and distribution of power in the device 2200.

The multimedia component 2208 includes a screen providing an output interface between the device 2200 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2208 includes a front-facing camera and/or a rear-facing camera. When the device 2200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2210 is configured to output and/or input audio signals. For example, the audio component 2210 includes a microphone (MIC) configured to receive an external audio signal when the device 2200 is in an operation mode, such as a call mode, a recording mode, and a voice recognition mode. The received audio signal may be further stored in the memory 2204 or transmitted via the communication component 2216. In some embodiments, the audio component 2210 further includes a speaker to output audio signals.

The I/O interface 2212 provides an interface between the processing component 2202 and peripheral interface modules, such as a keyboard, a click wheel, buttons, and the like.

The buttons may include, but are not limited to, a home button, a volume button, a starting button, and a locking button.

The sensor component 2214 includes one or more sensors to provide status assessments of various aspects of the device 2200. For instance, the sensor component 2214 may detect an open/closed status of the device 2200, relative positioning of components, e.g., the display and the keypad of the device 2200, a change in position of the device 2200 or a component of the device 2200, a presence or absence of user contact with the device 2200, an orientation or an acceleration/deceleration of the device 2200, and a change in temperature of the device 2200. The sensor component 2214 may include a proximity sensor configured to detect the presence of nearby objects without any physical contact. The sensor component 2214 may also include a light sensor, such as a CMOS or CCD image sensor, for use in imaging applications. In some embodiments, the sensor component 2214 may also include an accelerometer sensor, a gyroscope sensor, a magnetic sensor, a pressure sensor, or a temperature sensor.

The communication component 2216 is configured to facilitate communication, wired or wirelessly, between the device 2200 and other devices. The device 2200 can access a wireless network based on a communication standard, such as 2G, 3G, 4G LTE or 5G NR or a combination thereof. In an embodiment, the communication component 2216 receives a broadcast signal or broadcast associated information from an external broadcast management system via a broadcast channel. In an embodiment, the communication component 2216 further includes a near field communication (NFC) module to facilitate short-range communication. For example, the NFC module may be implemented based on radio frequency identification (RFID) technology, infra-red data association (IrDA) technology, ultra-wideband (UWB) technology, Bluetooth (BT) technology and other technologies.

In embodiments, the device 2200 may be implemented with at least one application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method for network access.

In embodiments, there is also provided a non-transitory computer readable storage medium including instructions, such as included in the memory 2204, executable by the processor 2220 in the device 2200, for performing the above method for network access. For example, the non-transitory computer-readable storage medium may be a ROM, a RAM, a CD-ROM, a magnetic tape, a floppy disc, an optical data storage device, and the like.

According to a first aspect of embodiments of the disclosure, a method for network access assistance is provided. The method is performed by a network device, and includes:

sending assistance information to a terminal, in which the assistance information is configured to be used by a terminal to access a network when waking up from a disconnected state.

In an embodiment, the assistance information is configured to be used by the terminal to perform cell selection or cell reselection in at least one target cell when waking up from the disconnected state.

In an embodiment, the assistance information includes at least one of a public land mobile network to which the target cell belongs, frequency information of the target cell, identification information of the target cell, or synchronization information of the target cell.

In an embodiment, the assistance information and the at least one target cell are in one-to-one correspondence; or a part of the assistance information is applicable to all of the at least one target cell, and another part of the assistance information and the at least one target cell are in one-to-one correspondence.

In an embodiment, accessing the network by the terminal when waking up from the disconnected state includes at least one of accessing the network by the terminal when waking up from extended discontinuous reception, or accessing the network by the terminal when waking up from a power saving mode.

In an embodiment, accessing the network by the terminal when waking up from extended discontinuous reception includes receiving, by the terminal, downlink information sent by the network after a period of extended discontinuous reception ends, and sending, by the terminal, uplink data to the network before the period of extended discontinuous reception ends.

In an embodiment, accessing the network by the terminal when waking up from the power saving mode includes performing, by the terminal, a tracking area update after a tracking area update timer expires, and sending, by the terminal, uplink data to the network before the tracking area update timer expires.

In an embodiment, the method further includes sending indication information to the terminal, in which the indication information is configured to indicate the terminal to use the assistance information.

In an embodiment, the assistance information is configured to be used by the terminal to access the network when waking up from extended discontinuous reception, and sending the indication information to the terminal includes sending the indication information to the terminal in response to determining that the terminal is configured with extended discontinuous reception.

In an embodiment, the assistance information is configured to be used by the terminal to access the network when waking up from the power saving mode, and sending the indication information to the terminal includes sending the indication information to the terminal in response to determining that the terminal is configured with the power saving mode.

In an embodiment, the indication information includes a target timer, and the indication information is configured to indicate the terminal to use the assistance information when the target timer expires, or the indication information is configured to indicate the terminal to use the assistance information when a target state is satisfied.

In an embodiment, the indication information is configured to indicate the terminal to use the assistance information when the target timer expires, the assistance information is configured to be used by the terminal to access the network when waking up from extended discontinuous reception, and a timing duration of the target timer is equal to a period of extended discontinuous reception.

In an embodiment, the method further includes determining a network where the terminal is located when the period of extended discontinuous reception ends, and generating the assistance information according to the network where the terminal is located.

In an embodiment, the indication information is configured to indicate the terminal to use the assistance information when the target timer expires, the assistance information is configured to be used by the terminal to access the network when waking up from the power saving mode, and a timing duration of the target timer is equal to a timing duration of a tracking area update timer.

In an embodiment, the method further includes determining a network where the terminal is located when the tracking area update timer expires according to the period, and generating the assistance information according to the network where the terminal is located.

In an embodiment, the indication information is configured to indicate the terminal to use the assistance information when the target state is satisfied, the assistance information is configured to be used by the terminal to access the network when waking up from extended discontinuous reception, and the target state is that a first period of extended discontinuous reception after the terminal enters the disconnected state ends.

In an embodiment, the indication information is configured to indicate the terminal to use the assistance information when the target state is satisfied, the assistance information is configured to be used by the terminal to access the network when waking up from the power saving mode, and the target state is that the terminal wakes up from the power saving mode.

In an embodiment, sending the assistance information to the terminal includes:

sending the assistance information to the terminal by carrying the assistance information in radio resource control information.

According to a second aspect of embodiments of the disclosure, a method for network access is provided. The method is performed by a terminal, and includes receiving assistance information sent by a network device, and accessing a network according to the assistance information, in response to waking up from a disconnected state.

In an embodiment, accessing the network according to the assistance information includes performing cell selection or cell reselection in at least one target cell according to the assistance information.

In an embodiment, the assistance information includes at least one of a public land mobile network to which the target cell belongs, frequency information of the target cell, identification information of the target cell, and synchronization information of the target cell.

In an embodiment, the assistance information and the at least one target cell are in one-to-one correspondence; or a part of the assistance information is applicable to all of the at least one target cell, and another part of the assistance information and the at least one target cell are in one-to-one correspondence.

In an embodiment, waking up from the disconnected state includes at least one of waking up from extended discontinuous reception, or waking up from a power saving mode.

In an embodiment, waking up from extended discontinuous reception includes receiving downlink information sent by the network after a period of extended discontinuous reception ends, and sending uplink data to the network before the period of extended discontinuous reception ends.

In an embodiment, waking up from the power saving mode includes performing a tracking area update after a tracking area update timer expires, and sending uplink data to the network before the tracking area update timer expires.

In an embodiment, the method further includes receiving indication information sent by the network device, and determining to use the assistance information according to the indication information.

In an embodiment, the method further includes determining to use the assistance information according to pre-agreed indication information.

In an embodiment, the indication information includes a target timer, and the indication information is configured to indicate the terminal to use the assistance information when the target timer expires, or the indication information is configured to indicate the terminal to use the assistance information when a target state is satisfied.

In an embodiment, the indication information is configured to indicate the terminal to use the assistance information when the target timer expires, a timing duration of the target timer is equal to a period of extended discontinuous reception, and accessing the network according to the assistance information, in response to waking up from the disconnected state, includes accessing the network according to the assistance information when the target timer expires, in response to waking up from extended discontinuous reception.

In an embodiment, the indication information is configured to indicate the terminal to use the assistance information when the target timer expires, a timing duration of the target timer is equal to a timing duration of a tracking area update timer, and accessing the network according to the assistance information, in response to waking up from the disconnected state, includes accessing the network according to the assistance information when the target timer expires, in response to waking up from the power saving mode of the disconnected state.

In an embodiment, the indication information is configured to indicate the terminal to use the assistance information when the target state is satisfied, the target state is that a first period of extended discontinuous reception after the terminal enters the disconnected state ends, and accessing the network according to the assistance information, in response to waking up from the disconnected state, includes accessing the network according to the assistance information when the first period of extended discontinuous reception after entering the disconnected state ends, in response to waking up from extended discontinuous reception of the disconnected state.

In an embodiment, the indication information is configured to indicate the terminal to use the assistance information when the target state is satisfied, the target state is that the terminal wakes up from the power saving mode, and accessing the network according to the assistance information, in response to waking up from the disconnected state, includes accessing the network according to the assistance information, in response to waking up from the power saving mode of the disconnected state.

In an embodiment, receiving the assistance information sent by the network device includes receiving radio resource control information sent by the network device, in which the radio resource control information carries the assistance information.

According to a third aspect of embodiments of the disclosure, an apparatus for network access assistance is provided. The apparatus is applicable to a network device, and includes an assistance sending module, configured to send assistance information to a terminal, in which the assistance information is configured to be used by a terminal to access a network when waking up from a disconnected state.

According to a fourth aspect of embodiments of the disclosure, an apparatus for network access is provided. The apparatus is applicable to a terminal, and includes an assistance receiving module, configured to receive assistance information sent by a network device, and a network access module, configured to access a network according to the assistance information in response to waking up from a disconnected state.

According to a fifth aspect of embodiments of the disclosure, an electronic device is provided. The device includes a processor and a memory configured to store processor-executable instructions. The processor is configured to perform the above method for network access assistance.

According to a sixth aspect of embodiments of the disclosure, an electronic device is provided. The device includes a processor and a memory configured to store processor-executable instructions. The processor is configured to perform the above method for network access.

According to a seventh aspect of embodiments of the disclosure, a computer-readable storage medium having computer programs stored thereon is provided. When the programs are executed by a processor, steps of the above method for network access assistance are implemented.

According to an eighth aspect of embodiments of the disclosure, a computer-readable storage medium having computer programs stored thereon is provided. When the programs are executed by a processor, steps of the above method for network access are implemented.

According to the embodiments of the disclosure, a network device can send assistance information to a terminal for use by the terminal to access a network after waking up from a disconnected state. Accordingly, after waking up from the disconnected state, the terminal can access the network according to the assistance information, without having to scan all frequency points of all supported systems to select an appropriate network, which is beneficial to reduce the power consumption of accessing the network, and reduce the delay in the process of accessing the network.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the present disclosure is limited only by the appended claims.

It should be noted that, in the document, relational terms such as "first" and "second" are only used to distinguish one entity or operation from another entity or operation, without necessarily requiring or implying the existence of any such actual relationship or sequence between these entities or operations. The terms "comprise", "include" or any other variation thereof are intended to encompass non-exclusive inclusion such that a process, method, article or device comprising a list of elements includes not only those elements, but also other not expressly listed elements, or also include elements inherent to such a process, method, article or device. Without further limitation, an element qualified by the phrase "comprising a . . . " does not preclude the presence of additional identical elements in a process, method, article or device that includes the element.

The methods and apparatuses provided by the embodiments of the disclosure are described in detail above, and specific examples are applied herein to illustrate the principles and implementation of the disclosure. The above descriptions of embodiments are only used to help understand the method of the disclosure and its core ideas; at the same time, for a person of ordinary skill in the art, there may be changes in specific implementation methods and application scope based on the ideas of the disclosure. In summary, the content of this specification should not be understood as a limitation of the disclosure.

What is claimed is:

1. A method for network access assistance, performed by a network device in a non-terrestrial network (NTN), comprising:

predicting a satellite to be accessed by a user equipment (UE) being about to enter an NTN coverage;

sending assistance information to the UE of an idle state, wherein the assistance information is used by the UE to perform cell selection in at least one target cell in response to entering the NTN coverage, the assistance information comprises frequency information of a carrier corresponding to the at least one target cell, and the at least one target cell is a cell corresponding to the satellite.

2. The method according to claim 1, wherein the assistance information further comprises at least one of:

a public land mobile network to which the target cell belongs, identification information of the target cell, or synchronization information of the target cell, a motion footprint of the satellite, ephemeris information of the satellite, a motion period of the satellite, or a motion speed of the satellite;

the assistance information and the at least one target cell are in one-to-one correspondence; or a part of the assistance information is applicable to all of the at least one target cell, and another part of the assistance information and the at least one target cell are in one-to-one correspondence.

3. The method according to claim 1, wherein accessing the network by the UE when waking up from the disconnected state comprises at least one of:

accessing the network by the UE when waking up from extended discontinuous reception, or accessing the network by the UE when waking up from a power saving mode.

4. The method according to claim 3, wherein accessing the network by the UE when waking up from extended discontinuous reception comprises:

receiving, by the UE, downlink information sent by the network after a period of extended discontinuous reception ends; and sending, by the UE, uplink data to the network before the period of extended discontinuous reception ends; or accessing the network by the UE when waking up from the power saving mode comprises:

performing, by the UE, a tracking area update after a tracking area update timer expires; and sending, by the UE, uplink data to the network before the tracking area update timer expires.

5. The method according to claim 3, wherein the method further comprises:

sending indication information to the UE, wherein the indication information is configured to indicate the UE to use the assistance information.

6. The method according to claim 5, wherein the assistance information is configured to be used by the UE to access the network when waking up from extended discontinuous reception, and sending the indication information to the UE comprises:

determining that the UE is configured with extended discontinuous reception; and sending the indication information to the UE;

or the assistance information is configured to be used by the UE to access the network when waking up from the power saving mode, and sending the indication information to the UE comprises:

determining that the UE is configured with the power saving mode; and sending the indication information to the UE.

7. The method according to claim 5, wherein the indication information comprises a target timer, and the indication information is configured to indicate the UE to use the assistance information when the target timer expires;

or the indication information is configured to indicate the UE to use the assistance information when a target state is satisfied.

8. The method according to claim 7, wherein the indication information is configured to indicate the UE to use the assistance information when the target timer expires, the assistance information is configured to be used by the UE to access the network when waking up from extended discontinuous reception, and a timing duration of the target timer is equal to a period of extended discontinuous reception, the method further comprises:

determining a network where the UE is located when the period of extended discontinuous reception ends; and generating the assistance information according to the network where the UE is located.

9. The method according to claim 7, wherein the indication information is configured to indicate the UE to use the assistance information when the target timer expires, the assistance information is configured to be used by the UE to access the network when waking up from the power saving mode, and a timing duration of the target timer is equal to a timing duration of a tracking area update timer, the method further comprises:

determining a network where the UE is located when the tracking area update timer expires; and generating the assistance information according to the network where the UE is located.

10. The method according to claim 7, wherein the indication information is configured to indicate the UE to use the assistance information when the target state is satisfied, the assistance information is configured to be used by the UE to access the network when waking up from extended discontinuous reception, and the target state is that a first period of extended discontinuous reception after the UE enters the disconnected state ends;

or the indication information is configured to indicate the UE to use the assistance information when the target state is satisfied, the assistance information is configured to be used by the UE to access the network when waking up from the power saving mode, and the target state is that the UE wakes up from the power saving mode.

11. A method for network access, performed by a user equipment (UE), comprising:

receiving assistance information sent by a network device in a non-terrestrial network NTN); and performing cell selection in at least one target cell according to the assistance information in response to the UE of an idle state entering an NTN coverage, wherein the assistance information comprises frequency information of a carrier corresponding to the at least one target cell, the at least one target cell is a cell corresponding to a satellite, and the satellite is predicted by the network device as a satellite to be accessed by the UE being about to enter the NTN coverage.

12. The method according to claim 11, wherein the assistance information further comprises at least one of:

a public land mobile network to which the target cell belongs, identification information of the target cell, synchronization information of the target cell, a motion footprint of the satellite, ephemeris information of the satellite, a motion period of the satellite, or a motion speed of the satellite;

the assistance information and the at least one target cell are in one-to-one correspondence; or a part of the assistance information is applicable to all of the at least one target cell, and another part of the assistance information and the at least one target cell are in one-to-one correspondence.

13. The method according to claim 11, wherein waking up from the disconnected state comprises at least one of:

waking up from extended discontinuous reception, or waking up from a power saving mode.

14. The method according to claim 13, wherein waking up from extended discontinuous reception comprises:

receiving downlink information sent by the network after a period of extended discontinuous reception ends; and sending uplink data to the network before the period of extended discontinuous reception ends;

or waking up from the power saving mode:

performing a tracking area update after a tracking area update timer expires; and sending uplink data to the network before the tracking area update timer expires.

15. The method according to claim 13, wherein the method further comprises:

receiving indication information sent by the network device; and determining to use the assistance information according to the indication information;

or the method further comprises:

determining to use the assistance information according to pre-agreed indication information.

16. The method according to claim 15, wherein the indication information comprises a target timer, and the indication information is configured to indicate the UE to use the assistance information when the target timer expires;

or the indication information is configured to indicate the UE to use the assistance information when a target state is satisfied.

17. The method according to claim 16, wherein the indication information is configured to indicate the UE to use the assistance information when the target timer expires, a timing duration of the target timer is equal to a period of extended discontinuous reception, and waking up from the disconnected state, accessing the network according to the assistance information, comprises:

waking up from extended discontinuous reception, accessing the network according to the assistance information when the target timer expires;

or the indication information is configured to indicate the UE to use the assistance information when the target timer expires, a timing duration of the target timer is equal to a timing duration of a tracking area update timer, and waking up from the disconnected state, accessing the network according to the assistance information, comprises:

waking up from the power saving mode of the disconnected state, accessing the network according to the assistance information when the target timer expires.

18. The method according to claim 16, wherein the indication information is configured to indicate the UE to use the assistance information when the target state is satisfied, the target state is that a first period of extended discontinuous reception after the UE enters the disconnected state ends, and waking up from the disconnected state, accessing the network according to the assistance information, comprises:

waking up from extended discontinuous reception of the disconnected state, accessing the network according to the assistance information when the first period of extended discontinuous reception after entering the disconnected state ends;

or the indication information is configured to indicate the UE to use the assistance information when the target state is satisfied, the target state is that the UE wakes up from the power saving mode, and waking up from the disconnected state, accessing the network according to the assistance information, comprises:

waking up from the power saving mode of the disconnected state, accessing the network according to the assistance information.

19. A user equipment (UE), comprising:

a processor; and a memory configured to store processor-executable instructions; wherein the processor is configured to:

receive assistance information sent by a network device in a non-terrestrial network (NTN); and performing cell selection in at least one target cell according to the assistance information in response to the UE of an idle state entering an NTN coverage, wherein the assistance information comprises frequency information of a carrier corresponding to the at least one target cell, the at least one target cell is a cell corresponding to a satellite, and the satellite is predicted by the network device as a satellite to be accessed by the U E being about to enter the NTN coverage.

20. A network device in a non-terrestrial network (NTN), comprising:

a processor; and a memory configured to store processor-executable instructions;

wherein the processor is configured to perform the method according to claim 1.

* * * * *